United States Patent
Chu et al.

(10) Patent No.: US 8,652,639 B2
(45) Date of Patent: Feb. 18, 2014

(54) METHOD FOR STRENGTHENING GLASS AND GLASS USING THE SAME

(75) Inventors: Guan-Yeu Chu, Taichung (TW); Chin-Hsun Ho, Taichung (TW); Ming-Wu Chen, Zhushan Township, Nantou County (TW); Yu-Ching Wang, Waipu Township, Taichung County (TW); Cheng-Ying Lin, Taichung (TW); Chin-Chu Hung, Yizhu Township, Chiayi County (TW)

(73) Assignees: Dongguan Masstop Liquid Crystal Display Co., Ltd., Dongguan, Guangdong Province (CN); Wintek Corporation, Taichung (TW)

( * ) Notice: Subject to any disclaimer, the term of this patent is extended or adjusted under 35 U.S.C. 154(b) by 0 days.

(21) Appl. No.: 13/112,331

(22) Filed: May 20, 2011

(65) Prior Publication Data
US 2011/0293928 A1 Dec. 1, 2011

(30) Foreign Application Priority Data
May 28, 2010 (TW) .............................. 99117316 A

(51) Int. Cl.
*B32B 17/06* (2006.01)

(52) U.S. Cl.
USPC ........... 428/410; 428/426; 428/432; 428/688; 428/689; 428/699; 428/701; 428/702

(58) Field of Classification Search
USPC ......... 428/432, 410, 426, 688, 689, 699, 701, 428/702
See application file for complete search history.

(56) References Cited

U.S. PATENT DOCUMENTS

| | | | | |
|---|---|---|---|---|
| 3,287,200 A * | 11/1966 | Hess et al. | ..................... | 428/410 |
| 3,807,980 A * | 4/1974 | Boffe et al. | ................... | 65/30.14 |
| 5,876,472 A * | 3/1999 | Gros et al. | ...................... | 65/30.1 |
| 5,930,046 A * | 7/1999 | Solberg et al. | ................ | 359/580 |
| 2002/0102394 A1 * | 8/2002 | Macquart et al. | ............. | 428/216 |
| 2002/0182453 A1 * | 12/2002 | McCurdy et al. | ............. | 428/702 |
| 2003/0170465 A1 * | 9/2003 | Krzyzak et al. | ............... | 428/428 |
| 2005/0250639 A1 * | 11/2005 | Siebers et al. | ................... | 501/68 |
| 2006/0063009 A1 * | 3/2006 | Naitou et al. | .................. | 428/427 |
| 2009/0197048 A1 * | 8/2009 | Amin et al. | .................... | 428/142 |
| 2010/0291353 A1 * | 11/2010 | Dejneka et al. | ............... | 428/192 |
| 2011/0014475 A1 * | 1/2011 | Murata | ......................... | 428/410 |
| 2011/0217535 A1 * | 9/2011 | Barton et al. | ................. | 428/220 |

OTHER PUBLICATIONS

Gy, R.; "Ion Exchange for Glass Strengthening;" Materials Science and Engineering B 149; 2008; pp. 159-165.
TW Office Action dated Jan. 17, 2013.

* cited by examiner

*Primary Examiner* — David Sample
*Assistant Examiner* — Lauren Colgan
(74) *Attorney, Agent, or Firm* — McClure, Qualey & Rodack, LLP

(57) ABSTRACT

A method for strengthening glass and a glass using the same are provided. The method for strengthening glass includes the following steps. Firstly, a glass substrate, which has a first surface and a second surface opposite to the first surface, is provided. Next, a barrier film is formed on at least one of the first surface and the second surface. Then, the glass substrate with the barrier film is immersed in a strengthening solution. The strengthening solution includes first ions, and the barrier film can limit the first ions in the quantity entering the glass substrate.

9 Claims, 3 Drawing Sheets

METHOD FOR STRENGTHENING GLASS AND GLASS USING THE SAME

This application claims the benefit of Taiwan application Serial No. 99117316, filed May 28, 2010, the subject matter of which is incorporated herein by reference.

BACKGROUND OF THE INVENTION

1. Field of the Invention

The invention relates in general to a method for strengthening glass and a glass using the same, and more particularly to a method for strengthening glass capable of controlling the cambering of the glass and a glass using the same.

2. Description of the Related Art

Float process is one of the methods for manufacturing glass substrate. During the float process, a glass solution in a molten state is placed on a tin solution, one surface of the glass solution contacts the tin solution, and the other surface of the glass solution is exposed in the air, and the glass solution in a molten state, after cooling down, is solidified as a glass substrate in a solid state. Following the formation process, a strengthening process is applied to the glass substrate. Let the ion-exchange strengthening process be taken for example. The glass substrate is immersed in a potassium nitrate solution. Due to the diffusion reaction between the sodium ions of the glass substrate and the potassium ions of the potassium nitrate solution, the potassium ions enter the glass to replace the sodium ions, so that the lattice structure of the glass substrate changes and the glass is strengthened. The size of the potassium ions is larger than that of the sodium ions.

Referring to FIG. 1 (prior art), a cross-sectional view of a generally known strengthened glass substrate is shown. Since the first surface 16 of the glass substrate 12 contacts the tin solution, the first surface 106 has more tin particles aggregated thereon than the second surface. During the process of strengthening the glass substrate, the first surface 16 uses tin particles as a barrier to limit the potassium ions of the potassium nitrate solution in the quantity entering the first surface 16. Consequently, due to the large difference between the quantity of the potassium ions entering the first surface 16 of the glass substrate 12 and the quantity of the potassium ions entering the second surface 18 of the glass substrate 12, the internal stress of the first surface 16 is thus different from the internal stress of the second surface 18, and the glass substrate 12 is cambered as indicated in FIG. 1.

SUMMARY OF THE INVENTION

The invention is directed to a method for strengthening glass and a glass using the same. A barrier film is formed on the glass substrate for limiting the solution ions in the quantity entering the glass substrate so as to control the cambering of the glass substrate.

According to a first aspect of the present invention, a method for strengthening glass is provided. The method for strengthening glass includes the following steps. Firstly, a glass substrate, which has a first surface and a second surface opposite to the first surface, is provided. Next, a barrier film is formed on at least one of the first surface and the second surface. Then, the glass substrate with the barrier film is immersed in a strengthening solution. The strengthening solution includes first ions. When the glass substrate with the barrier film is immersed in the strengthening solution, the barrier film can limit the first ions in the quantity entering the glass substrate.

According to a second aspect of the present invention, a glass strengthened by being immersed in a strengthening solution is provided. The strengthening solution includes first ions. The glass includes a glass substrate and a barrier film. The glass substrate has a first surface and a second surface opposite to the first surface. The barrier film is disposed on at least one of the first surface and the second surface and used for limiting the first ions in the quantity entering the glass substrate.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
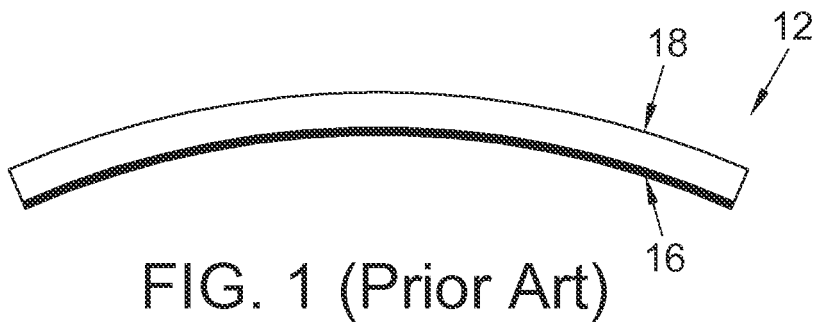
FIG. 1 (prior art) shows a cross-sectional view of a generally known strengthened glass substrate.
Figure 2:
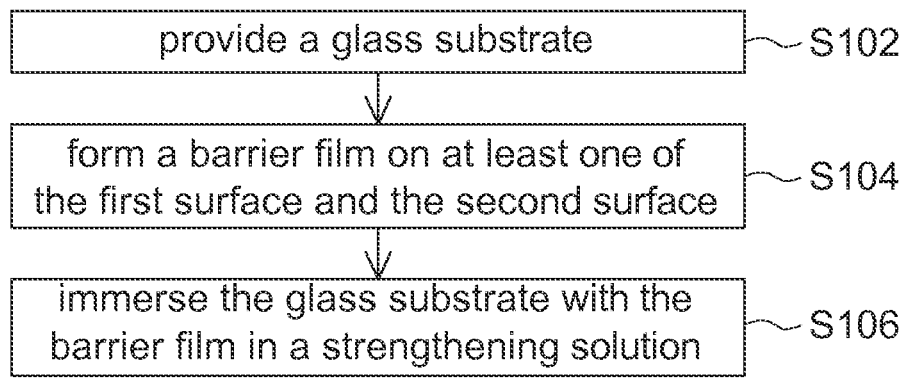
FIG. 2 shows a flowchart of a method for strengthening glass according to a first embodiment of the invention.
Figure 3A:
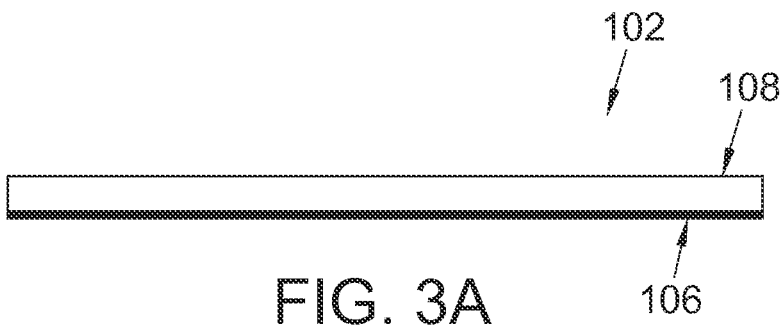
FIGS. 3A-3B show the process for strengthening glass according to a first embodiment of the invention.
Figure 3B:
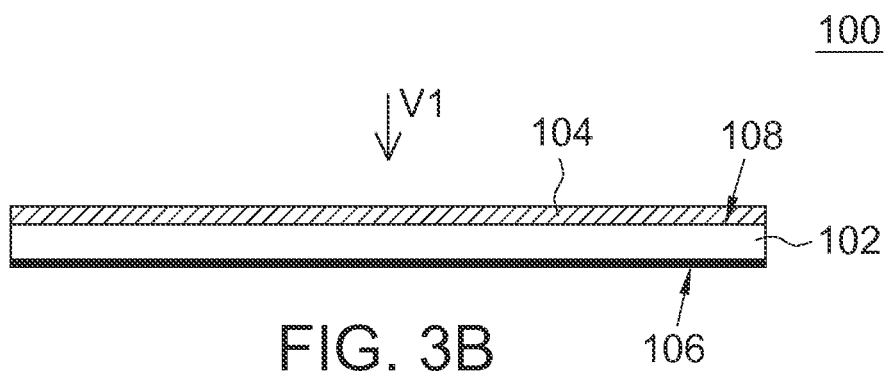

Referring to both FIG. 2 and FIGS. 3A-3B. FIG. 2 shows a flowchart of a method for strengthening glass according to a first embodiment of the invention. FIGS. 3A-3B show the process for strengthening glass according to a first embodiment of the invention.

In step S102 as indicated in FIG. 3A, a glass substrate 102 is provided. The glass substrate 102 can be realized by a float glass formed by using the floating process. However, the invention is not limited thereto, and the glass substrate 102 can also be formed by using other glass manufacturing methods.

The glass substrate 102 has a first surface 106 and a second surface 108 opposite to the first surface 106. The first surface 106 is the surface contacting the solution during the floating process and the second surface 108 is the surface contacting the air, wherein the solution is such as a tin solution. After the glass substrate 102 is formed by the floating process, the first surface 106 has more tin particles aggregated thereon than the second surface 108.

Next, in step S104 as indicated in FIG. 3B, a barrier film 104 is formed on the entire second surface 108 of the glass substrate 102 to form a glass 100. However, the invention is not limited thereto, and the barrier film 104 can also be formed on the first surface 106 of the glass substrate 102. The barrier film 104 can be formed on the glass substrate 102 by way of adhesion, coating, electroplating or other methods.

Then, in step S106, the glass 100 with the barrier film 104 can be immersed in a strengthening solution (not illustrated) by way of ion exchange to strengthen the glass 100. The strengthening solution has a number of first ions. If the strengthening solution is composed of potassium nitrate, then the first ions are potassium ions. The glass substrate 102 has second ions, such as sodium ions. When ion substitution occurs due to the diffusion reaction between the glass 100 and the strengthening solution, the potassium ions enter the glass substrate 102 to replace the sodium ions so as to strengthen the glass substrate. The size of the potassium ions is larger than that of sodium ions, wherein 'size' here refers to the radius of ions or atoms.

Besides, if the glass substrate is formed by other manufacturing methods or other glass materials, then the second ions of the glass substrate and the first ions of the strengthening solution can be realized by other types of ions. For example, when the glass substrate includes lithium ions, the first ions of the strengthening solution can be realized by sodium ions whose size is larger than that of lithium ions.

The barrier film 104 limits the potassium ions of the strengthening solution in the quantity entering the glass substrate 102 through the barrier film 104, so that the quantity of the potassium ions entering the second surface 108 will differ less with the quantity of the potassium ions entering the first surface 106. Furthermore, by balancing the ion exchange rate between the first surface 106 and the second surface 108, the first surface 106 and the second surface 108 of the glass substrate 102 will have similar quantities of potassium ions aggregated thereon, and the first surface 106 and the second surface 108 will have similar levels of internal stress. Thus, the glass 100 will generate very tiny cambering or no cambering at all. That is, the glass 100 of the present embodiment of the invention is a strengthened flat glass with excellent flatness.

The method for strengthening glass of the present embodiment of the invention largely improves the cambering of thin glass. Here, 'thin glass' refers to the glass substrate whose thickness ranges between 0.1 mm and 0.55 mm. During the strengthening process, thin glass may be severely cambered due to the small thickness. The strengthening method of the present embodiment of the invention largely reduces the cambering and largely increases flatness for thin glass. Anyone who is skilled in the technology of the invention will understand that the method for strengthening glass of the present embodiment of the invention is not restricted by the thickness of the glass substrate.

The barrier film 104 can be realized by metal film, silicon dioxide ($SiO_2$) film, titanium dioxide ($TiO_2$) film, tantalic oxide ($Ta_2O_5$) film or niobium oxide ($Nb_2O_5$) film.

In addition, the refractive index of the barrier film 104 can be higher than the refractive index of the glass substrate 102. For example, the barrier film 104 can be realized by $TiO_2$ film, $Ta_2O_5$ film or $Nb_2O_5$ film whose refractive index is higher than that of the glass substrate 102 so as to increase the reflection of the glass substrate 102. However, the invention is not limited thereto, and in an implementation, the refractive index of the barrier film 104 can also be lower than that of the glass substrate 102. For example, the barrier film 104 can be formed by a $SiO2$ film whose refractive index is lower than that of the glass substrate 102 so as to increase the transmittance of the glass substrate 102.

The thickness of the barrier film 104 roughly ranges between 1 nm and 100 nm. The barrier film 104, being so thin, has very limited or even nil influence on the optical properties of the glass substrate 102.

Moreover, the heat-resistant temperature of the barrier film 104 needs to be higher than the operating temperature of the strengthening process. The heat-resistant temperature of the barrier film 104 is such as 400° C., which is higher than the temperature of the strengthening solution lest the barrier film 104 might be damaged by the high temperature. However, the above exemplification of temperature is not for limiting the invention, and the present embodiment of the invention does not limit the heat-resistant temperature of the barrier film 104 as long as the barrier film 104 will not be damaged during the strengthening process.

The barrier film 104 can be formed by a transparent or a non-transparent material. For example, when the glass 100 is used in a display device, the barrier film 104 can be formed by a transparent material. In practical application, the transmittance of the barrier film 104 is based on the purpose of the glass 100, and the present embodiment of the invention does not impose any further restrictions.

Figure 4:
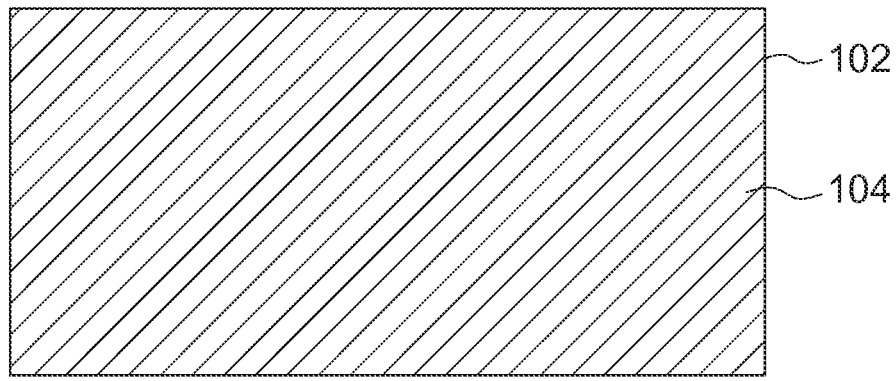
FIG. 4 shows a top view of glass viewed along the direction V1 of FIG. 3B.
Figure 5:
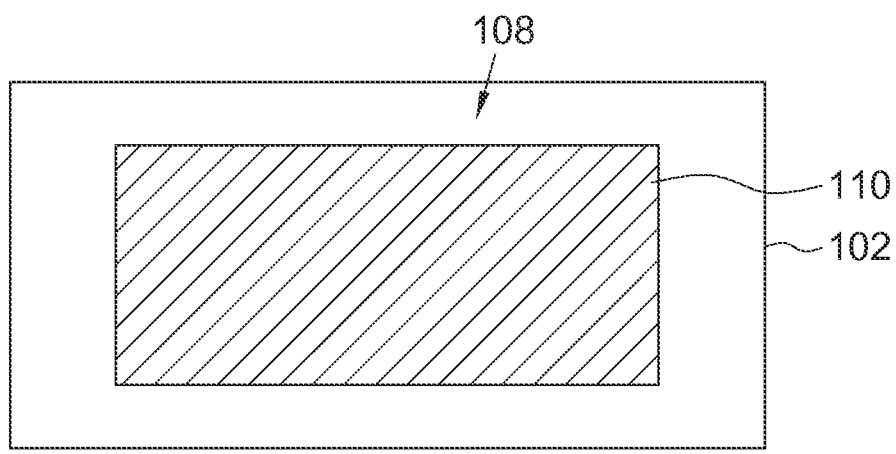
FIG. 5 shows a top view of glass according to other embodiments of the invention.
Figure 6:
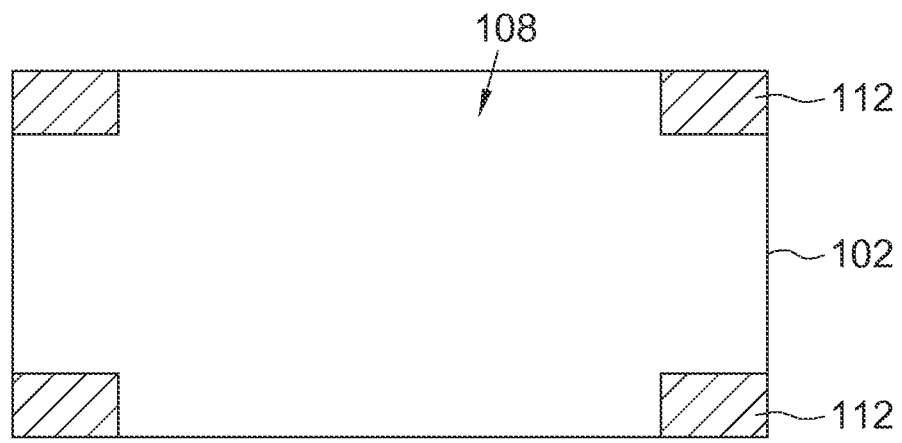
FIG. 6 shows a top view of glass according to another embodiments of the invention.

Referring to FIG. 4, a top view of glass viewed along the direction V1 of FIG. 3B is shown. The barrier film 104 of the present embodiment of the invention is spread over the entire second surface 108. However, such exemplification is not for limiting the invention. Referring to FIG. 5, a top view of glass according to other embodiments of the invention is shown. The barrier film 110 is a rectangle formed at the central region of the second surface 108 of the glass substrate 102. Or, the barrier film 110 can be any shape formed at any region of the second surface 108. Referring to FIG. 6, a top view of glass according to another embodiment of the invention is shown. A number of the barrier films 112 can be separately formed at any region of the second surface 108.

In other implementations, the barrier film can be formed on both the first surface 106 and the second surface 108 of the glass substrate 102. The barrier film formed on the first surface 106 of the glass substrate 102 is similar to the barrier film 104 formed on the second surface 108, and is not repeated here.

To summarize, the barrier film of the present embodiment of the invention has many implementations in terms of shape, quantity and formation location. That is, the present embodiment of the invention does not limit the barrier film formed on the second surface 108 or on both the first surface 106 and the second surface 108 of the glass substrate 102 in terms of shape, quantity and formation location.

Second Embodiment

Figure 7:
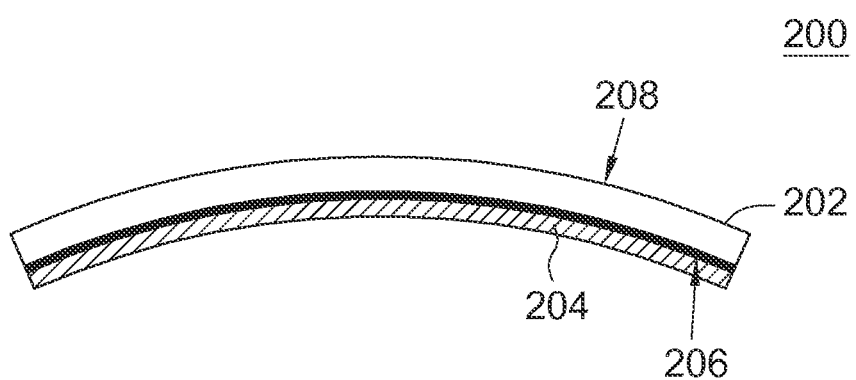
FIG. 7 shows a cross-sectional view of a glass according to a second embodiment of the invention.

Referring to FIG. 7, a cross-sectional view of a glass according to a second embodiment of the invention is shown. The second embodiment is different from the first embodiment in that the barrier film 204 of the second embodiment can only be formed on the first surface 206 of the glass substrate 202.

The glass 200 includes a glass substrate 202 and a barrier film 204. The glass substrate 202 has a first surface 206 and a second surface 208 opposite to the first surface 206. The glass substrate 202, the first surface 206 and the second surface 208 are respectively similar to the glass substrate 102, the first surface 106 and the second surface 108 of the first embodiment, and the similarities are not repeated here.

In the present embodiment of the invention, the barrier film 204 can be formed on the first surface 206. Since the first surface 206 has more tin particles aggregated thereon and the barrier film 204 is further disposed as a barrier, the quantity of the potassium ions entering the first surface 206 is largely decreased. Thus, due to the large difference between the quantity of the potassium ions entering the second surface 208 and the quantity of the potassium ions entering the first surface 206, the difference between the internal stress of the first surface 206 and the internal stress of the second surface 208 is thus widened, hence generating large cambering to the glass substrate 202.

The glass 200 can be used as a glass base for a cover glass. Here, 'cover glass' refers to an element assembled in an LCD panel for protecting the LCD panel. In general, the cover glass and the LCD panel are separated by a suitable distance lest the cover glass might contact the LCD panel. The cover glass has an anti-reflection film adhered thereon, wherein the anti-reflection film, after absorbing the moisture in the air, will be deformed and cause the cover glass to camber. After the cambered cover glass contacts the LCD panel, Newton ring will occur due to optical interference and further deteriorate display quality. The anti-reflection film can be realized by a TAC anti-reflection film for example.

If the glass 200 of the present embodiment of the invention is used as a glass base for a cover glass, the cambering of the glass 200 (such as the cambering illustrated in FIG. 7) provides a sufficient cambering tolerance. To put it in greater details, when TAC anti-reflection film (not illustrated) adhered on the glass 200 expands and force the glass 200 to camber towards the lower part of FIG. 7, the glass 200 with larger cambering exactly provides sufficient tolerance to avoid the glass 200 cambering too much towards the lower part of FIG. 7 so as to contact the LCD panel.

According to the method for strengthening glass and the glass using the same disclosed in the above embodiments of the invention, a barrier film is disposed on the glass substrate to limit the first ions of the strengthening solution in the quantity entering the glass substrate. That is, the flatness or the cambering of the glass substrate is controlled by the control of the ion exchange rate.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A strengthened glass substrate comprising a first surface and a second surface opposite to the first surface,
    the first surface has tin particles aggregated thereon as a result of forming the substrate by a float process;
        a barrier film disposed on the second surface, wherein the glass substrate is strengthened by ion exchange with a first ion in the presence of the barrier layer so that the first surface and the second surface have a substantially similar concentration of the first ion.

2. The glass substrate according to claim 1, wherein the barrier film is selected from the group consisting of metal film, silicon dioxide ($SiO_2$) film, titanium dioxide ($TiO_2$) film, tantalic oxide ($Ta_2O_5$) film and niobium oxide ($Nb_2O_5$) film.

3. The glass substrate according to claim 2, wherein the thickness of the barrier film ranges between 1 nm and 100 nm.

4. The glass substrate according to claim 1, wherein a heat-resistant temperature of the barrier film is higher than the temperature of the strengthening solution.

5. The glass substrate according to claim 1, wherein the barrier film is formed on the entirety of the second surface.

6. The glass substrate according to claim 1, wherein the composition of the glass substrate comprises a plurality of second ions, and the size of each first ion is larger than that of each second ion.

7. The glass substrate according to claim 1, wherein the barrier film is formed on only a portion of the second surface.

8. The glass substrate according to claim 1, wherein the barrier film is only formed on the second surface.

9. The glass substrate according to claim 1, wherein the glass is formed by a method comprising the following steps in sequence:
    providing a glass substrate formed by a floating process, wherein the glass substrate has a first and second surface, the first surface being contact with a tin solution, the second surface being in contact with air;
    forming the barrier film on the second surface of the glass substrate; and
    immersing the glass substrate with the barrier film in a strengthening solution, wherein the strengthening solution comprises a plurality of first ions, the barrier film limits the first ions in a quantity entering the glass substrate, so that a quantity of the first ions entering the second surface is similar in quantity of the first ions entering the first surface for controlling a flatness or a camber of the glass substrate.

* * * * *